(12) United States Patent
Hammond et al.

(10) Patent No.: US 12,012,181 B1
(45) Date of Patent: Jun. 18, 2024

(54) CLAMPING STAND

(71) Applicants: Robert James Hammond, Irvine, CA (US); Colleen Rose Hammond, Irvine, CA (US)

(72) Inventors: Robert James Hammond, Irvine, CA (US); Colleen Rose Hammond, Irvine, CA (US)

(*) Notice: Subject to any disclaimer, the term of this patent is extended or adjusted under 35 U.S.C. 154(b) by 0 days.

(21) Appl. No.: 18/519,034

(22) Filed: Nov. 26, 2023

Related U.S. Application Data

(60) Provisional application No. 63/513,119, filed on Jul. 12, 2023, provisional application No. 63/484,095, filed on Feb. 9, 2023, provisional application No. 63/385,964, filed on Dec. 3, 2022.

(51) Int. Cl.
*B63B 32/80* (2020.01)
*B63B 34/26* (2020.01)
*F16M 11/22* (2006.01)

(52) U.S. Cl.
CPC .............. *B63B 32/80* (2020.02); *B63B 34/26* (2020.02); *F16M 11/22* (2013.01)

(58) Field of Classification Search
CPC ... F16B 2/14; F16B 2/18; F16M 11/22; B63B 32/80; B63B 34/26

USPC .................................. 248/316.2, 316.3, 510
See application file for complete search history.

(56) References Cited

U.S. PATENT DOCUMENTS

| | | | | |
|---|---|---|---|---|
| 4,624,432 A * | 11/1986 | Salacuse | ............... | F16L 3/1203 248/316.5 |
| 5,277,387 A * | 1/1994 | Lewis | ..................... | H02G 3/26 248/74.2 |
| 8,973,880 B2 * | 3/2015 | Goffman | .................. | F16B 2/10 248/230.4 |
| 10,165,927 B2 * | 1/2019 | Mesa | .................... | A47L 15/503 |

* cited by examiner

*Primary Examiner* — Alfred J Wujciak
(74) *Attorney, Agent, or Firm* — Kevin Schraven; Anooj Patel; Hankin Patent Law, APC

(57) ABSTRACT

A clamping stand comprising a pair of cams, each cam operating as a cylindrical cam, having a clamping member facing the clamping member of an opposite clamping member for holding the object therebetween; and having a lower portion configured for arcuate motion connected by a linkage assembly that translates linear movement to rotational movement about a pivot axis, enabling uniform clamping pressure on an object through actuation of the linkage assembly and facilitating clamping through arcuate motion of the lower portions.

8 Claims, 6 Drawing Sheets

CLAMPING STAND

CROSS-REFERENCE TO RELATED APPLICATION

This Patent application claims priority to U.S. Provisional Patent Application No. 63385964, filed on Dec. 3, 2022, and entitled "Portable Stand with Foam Rollers for Inflatable Standup Paddleboard," and to U.S. Provisional Patent Application No. 63/484,095, filed on Feb. 9, 2023, and entitled "Inflatable stand for iSUPs," and to U.S. Provisional Patent Application No. 63/513,119, filed on Jul. 12, 1923, and entitled "Wedged Stand for Inflatable Standup Paddleboards," the contents of which are expressly incorporated herein by this reference, and to which priority is claimed.

FIELD OF THE DISCLOSURE

The present disclosure relates generally to devices, methods, and systems for using a clamping device. More specifically, the present disclosure relates to a device aimed at securing large objects, such as inflatable standup paddleboards, as well as other aquatic equipment like surfboards, paddleboards, or kayaks. The device can also be used to temporarily hold building materials such as drywall, plywood, doors, or tabletops.

BACKGROUND OF THE DISCLOSURE

Cleaning inflatable standup paddleboards (iSUPs) and rigid paddleboards can be challenging due to their large size. Typically, people lay them flat on one side to wash, then flip them to wash the other side and towel-dry. This method is time-consuming and can make the washed side dirty again. Some use buckets or foldable chairs to prop up the boards for easier access, but these solutions aren't always practical or portable. Specialized stands for iSUPs and large paddleboards require a tether for wind gusts, are heavy, not easily storable on the iSUP, and challenging to transport.

SUMMARY OF THE DISCLOSURE

The present invention addresses existing issues by providing a clamping stand that is both low profile and portable. This stand is lightweight yet capable of stably supporting an inflatable stand-up paddleboard (iSUP) on its side, elevating it substantially above the ground. Such positioning is ideal for maintenance activities like washing and drying, as well as for display or storage purposes. Notably, this is achieved without the need for a tether. Additionally, the stand can be conveniently stowed on the iSUP when in use, and it's designed to be easily transported along with the iSUP over short distances.

In accordance with an aspect of the present disclosure, the above and other objects can be accomplished by the provision of a clamping stand, comprising a pair of cams, each cam operating as a cylindrical cam, and having an upper portion configured for clamping—which, for the purposes of this disclosure may be called a clamping member—to hold in cooperation with each other, an object between them; and having a lower portion configured for arcuate motion connected by a linkage assembly that translates linear movement to rotational movement about a pivot axis, enabling uniform clamping pressure on an object through actuation of the linkage assembly and facilitating clamping through arcuate motion of the lower portions.

Preferably, each cam in the pair is outfitted with a counterweight designed to induce an outward rotation when the strap is slack, thereby maintaining the strap in a taut position suitable for placing objects, such as inflatable stand-up paddleboards (iSUPs). The counterweight, which may be a weight permanently affixed to or detachably connected to the cam, can be made from various materials, including but not limited to fabric.

One embodiment may be a clamping stand comprising two cams, each featuring an inflatable cylinder with a right triangular prism selectively and releasably attached. This prism, facing the strap and serving as the clamping interface, can be adjusted via a Velcro attachment mechanism, with a hook pad on the prism aligning with a loop pad on the cylinder, and with calibration marks on the cylinders to aid in positioning the prisms. The said loop pad extends in length greater than the length of the said hook pad so that the wedge may be repositioned as needed. The adjustable design of the prisms accommodates objects of varying thicknesses and ensures secure positioning when the strap is actuated to initiate rotating of the cams.

The triangular prism, referred to as a "wedge" within this specification, can be a single unit or comprise multiple units per cam to suit different object shapes. Where an object presents an uneven clamping surface—such as a door with hinges or a knob—multiple wedges can be strategically employed to bypass these irregularities, thereby enabling the application of consistent clamping pressure to secure the object firmly.

The wedge includes a side designed for direct contact with the object it is meant to secure; this side is referred to as a clamping face. The clamping face is preferably flat, adopting the texture of either the material constituting the wedge or its covering. The effectiveness of the clamping face can vary depending on the texture and surface of the object to be clamped. To increase its versatility, the clamping face can be customized with a variety of releasable covers, each suited for different types of materials—such as a surface that may provide better grip for objects made of plastic, wood, or glass—ensuring that the clamping mechanism can adapt to the specific needs of the object being held.

Another embodiment may comprise a pair of cams each comprising a single-piece construction, potentially using injection molding, that integrates the lower arcuate portion of the cylindrical cams with the clamping member of the upper portion.

Another embodiment may comprise an adjustable linkage band comprising a flexible strap or a plurality of flexible straps with an adjustable feature to extend length or shorten length to accommodate varying thicknesses of objects. The strap or straps may be comprised of a variety of materials including but not limited to fabric, rubber, or synthetic rubber.

In an embodiment where the strap is typically affixed to the middle of each cylinder's height, the design assumes that an object will rest evenly on the linkage assembly for secure clamping. However, if the object has protrusions that may interfere with the linkage assembly—such as a door with hinges in the middle—this standard placement may not allow for correct positioning on the linkage assembly, impeding the clamping action. To accommodate such objects, an alternative linkage assembly configuration may be utilized; for instance, replacing the single central strap with two straps positioned to the sides of the middle. This would permit the object to be clamped securely without the protrusions interfering with the strap, enabling proper actuation.

Preferably, the clamping device additionally includes an anchoring strap, designed for securing and transporting objects, which can be releasably connected to a D-ring situated on the exterior of each cam.

The clamping stand may be used on its own or in combination with more stands for enhanced stability, particularly for longer items like kayaks or extended lengths of plywood. For added durability, especially in environments like construction sites where the cylinders may be at risk from hazards such as nails, a flexible protective sleeve can be fitted over each cam or inflatable cylinder.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

REFERENCE NUMBERS USED

Figure 1:
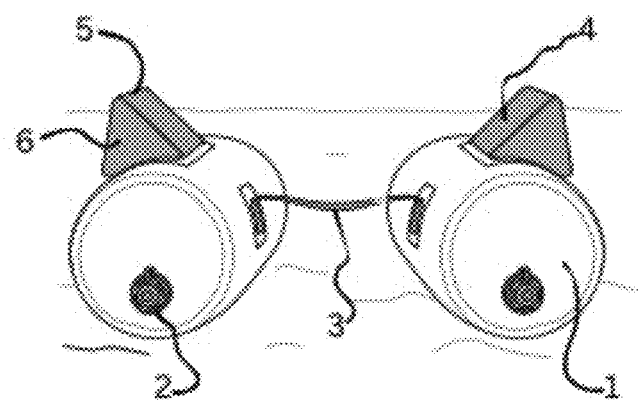
FIG. 1 is an illustration of one embodiment of a clamping device for iSUPs.

1 Inflatable cylinder (cam)
2 Inflation valve
3 Connecting strap (linkage assembly)
4 Face one of the clamping members
5 Face three of the clamping members
6 Front triangular face of wedge
7 D-ring
8 iSUP
9 Clockwise rotations of left cylinder
10 Counterclockwise rotations of right cylinder
11 Handle of iSUP
12 Velcro loop pad with calibration markings

DETAILED DESCRIPTION OF THE ILLUSTRATIVE EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

One embodiment may be a clamping device comprising a pair of cams, each having an upper portion and a lower portion, the upper portion having a clamping member and the lower portion configured for arcuate motion. In addition, the clamping device includes a linkage assembly, which in one embodiment is a flexible strap—or a plurality of flexible straps—that is configured to attach to each cam so that the linear movement of the flexible strap or plurality of flexible straps begin rotation of the cams. The corresponding rotation of the complementing clamping members, in turn, clamp onto an object disposed between inner ends of the pair of cams.

FIG. 1 is an illustration of one embodiment of a clamping device. In this embodiment the stand comprises a pair of inflatable cylinders 1 with inflation means 2 that are attached to each other with a flexible strap 3. Attached to each inflatable cylinder is a wedge 4. The wedge 4 may be a right triangular prism, also referred to as a right wedge, comprising three lateral rectangular faces, face one, face two, and face three, and two opposing isosceles triangles, a front face and a rear face. According to FIG. 1, face one 4 is to the left of the front face 6, face two is below the front face, face three is right of the front face 5. Accordingly, concerning the left cylinder in FIG. 1, face three faces the strap; concerning the right cylinder in FIG. 1, face one faces the strap.

The lateral rectangular face disposed between two lateral rectangular faces of the right wedge, or face two, is the base of the right wedge and is attached to the top surface of the cylinder 1. The longitudinal axis of the right wedge is approximately aligned parallel to the cylinder's longitudinal axis, which is the central lengthwise line running from one end of the cylinder to the other. The right wedge, or clamping member, is approximately positioned at an angle of ninety degrees relative to the point where the strap attaches to the structure that includes the cylinder 1 and wedge. There is an equal distance from the edges of the wedge's base to the respective ends of the cylinder, ensuring the wedge is centrally located on top of the cylinder.

Each cylinder 1 may have a counterweight that causes it to rotate outward when the strap 3 is not loaded, setting the strap approximately taut for placement of an inflatable stand-up paddleboard (iSUP) 8 or other object for clamping. This creates the first position, with the plane of face three 5 on the left cylinder and the plane of face one 4 on the right cylinder angled substantially greater than 90 degrees from the ground, creating the widest opening at the top edges of the clamping members as seen in FIG. 1. In the first position, the strap 3 distance between the cylinders is approximately as wide as the thickness of the object to be clamped. This spacing—both between the cylinders 1 and at the top edges of the clamping members 5—allows for the easy insertion of an iSUP 8 into the holder.

For objects that exceed the distance between each cam or cylinder 1 when the strap 3 is in its initial position, activating the clamping stand may be challenging. This difficulty arises because the object's sides might be obstructed by the cam's sides. To resolve this, the clamping stand's linkage assembly or connecting strap 3 can be adjusted to fit thicker objects. This adjustment can be achieved either by using a longer strap from the start or by extending an adjustable strap to a greater length.

Figure 6:
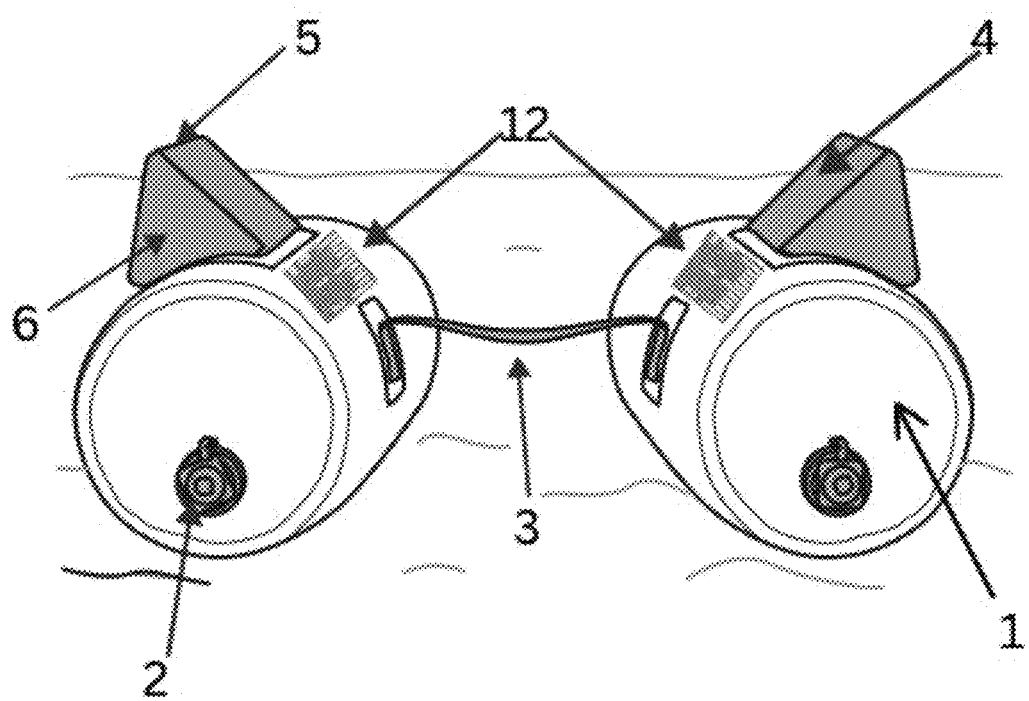
FIG. 6 is an illustration of one embodiment of a clamping device that features a Velcro attachment mechanism, particularly a Velcro loop pad that extends beyond the Velcro hook pad on the base of the wedge. It may include calibration markings to aid in repositioning the wedges.

Another embodiment may comprise adjustable wedges to firmly secure items that are not only slimmer than the strap's spacing but also thinner than what the stand typically holds. These wedges come with Velcro hook pads that can be releasably attached to each cylinder 1. Each cylinder 1 features a corresponding Velcro loop pad that extends past the hook pad, allowing the position of the wedge to be customized based on the item's thickness, as illustrated in FIG. 6. The design enables the wedges to be positioned along the loop pad for a tailored fit. The loop pad may also have calibration markings to assist in aligning the wedges evenly. Adjusting the wedge closer to the strap's attachment points reduces the distance between the clamping members' medial faces, ensuring a secure clamp. This feature is especially useful for securely holding thin items like inflatable stand-up paddleboards, paddleboards, surfboards, and similar objects.

Figure 2:
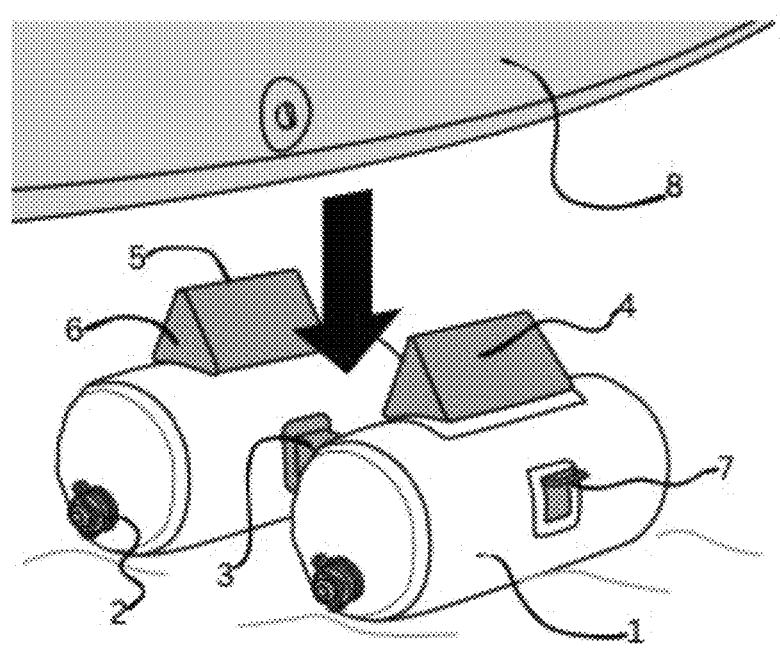
FIG. 2 is an illustration of one embodiment of a clamping device for iSUPs with an iSUP suspended above prior to insertion into the clamping device.
Figure 3:
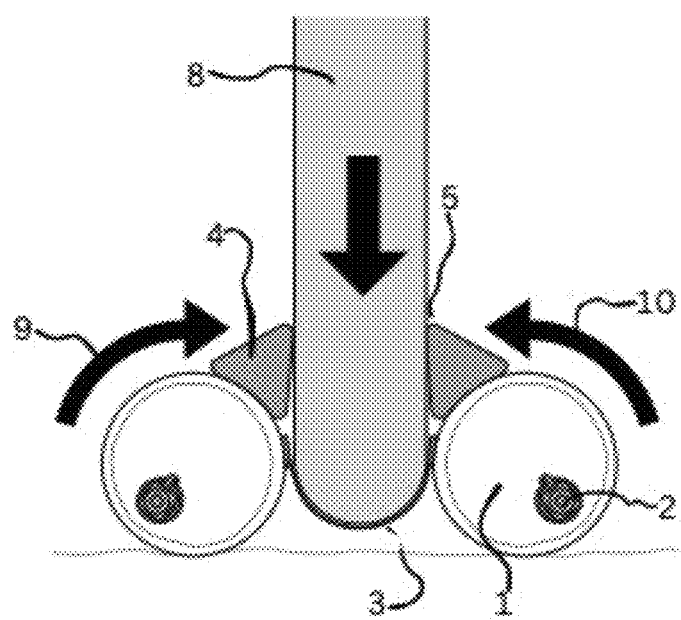
FIG. 3 is an illustration of one embodiment of a clamping device for iSUPs with an iSUP resting on a connecting strap secured by a pair of clamping members.
Figure 4:
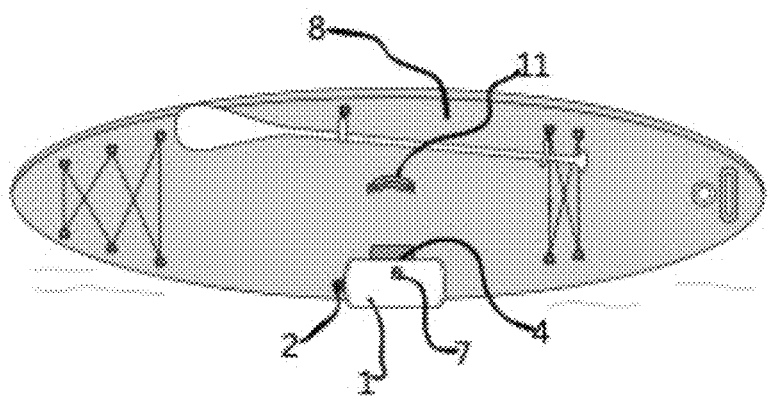
FIG. 4 is an illustration of one embodiment of a clamping device for iSUPs with a sideview of an iSUP between its clamping members.)
Figure 5:
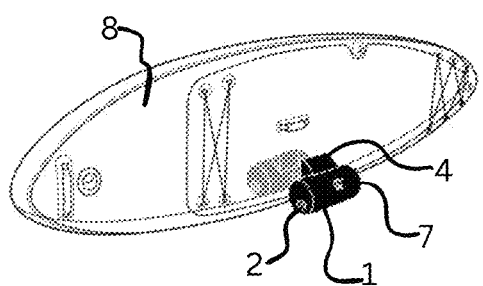
FIG. 5 is an illustration of one embodiment of a clamping device for iSUPs holding an iSUP between its clamping members.

Once the cylinders are each inflated to between 1 and 1.5 PSI and the correct adjustments are made to the linkage assembly and wedge positions, actuation of the clamping device occurs when the iSUP 8 is placed lengthwise, with its handle 11 aligned to the wedges, upon the flexible strap 3, then, as the iSUP 8 is allowed to descend, the weight of the iSUP 8 causes the strap to move downward and initiate medial rotation 9, 10 of each cylinder; consequently, the space between the cylinders and the planes of the clamping members 5 and 4 decrease. These motions, as illustrated in FIG. 2 and FIG. 3, cause a collision between the clamping members and the sides of the iSUP, resulting in a consistent clamping pressure that secures the iSUP, which FIG. 3 illustrates. The second position occurs when rotation ceases and much of the iSUP's weight has been transferred to the clamping members to secure the iSUP in place; the clamping face 4 and 5 of each clamping member is approximately perpendicular to the plane of the surface.

In the second position, maintenance tasks such as washing and drying the iSUP, as well as attaching fins or a leash, can be performed. Additionally, the iSUP 8 can be displayed or stored in this position. For mobility, an anchoring strap can be used to attach the iSUP to the stand. Once the anchoring strap is fastened to the D rings 7, the iSUP can be conveniently moved by its handle 11. The anchoring strap may have a quick release mechanism for swift engagement and release of the object. The stand's lightweight yet durable design facilitates easy transportation. Moreover, even though the clamping pressure of the clamping stand is sufficient to secure the iSUP in light winds, the anchoring strap helps to stabilize the iSUP 8 against unsuspected moderate wind gusts.

What is claimed is:

1. A clamping stand comprising:
    a pair of cams, each having an upper portion configured for clamping to hold an object between them in cooperation with each other, and a lower portion configured for arcuate motion;
    a linkage assembly coupling the pair of cams configured to translate linear movement to rotational movement about a pivot axis, enabling uniform clamping pressure on an object through actuation of the linkage assembly and facilitating clamping through arcuate motion of the lower portions;
    wherein the upper and lower portions of each cam are either integral or separable; and
    wherein the upper portion of each cam comprises a wedge and the lower portion comprises an inflatable cylinder.

2. The clamping stand of claim 1, wherein the linkage assembly includes one or more flexible straps.

3. The clamping stand of claim 1, wherein the linkage assembly is adjustable in length.

4. The clamping stand of claim 1, wherein each wedge is releasably coupled to each inflatable cylinder using a Velcro fastening system comprising a hook pad fixedly attached to each wedge, and a corresponding Velcro loop pad fixedly attached to each cylinder, with the loop pad extending beyond the hook pad to facilitate the repositioning of the wedge.

5. The clamping stand of claim 1, further comprising a D ring on each inflatable cylinder, and an anchoring strap to secure the clamped object for transport or adjustment.

6. The clamping stand of claim 1 wherein the clamping face may be customized with a variety of releasable covers, each suited for different types of materials.

7. The clamping stand of claim 1 wherein the wedge comprises at least one unit.

8. The clamping stand of claim 1 wherein the wedge comprises multiple units.

* * * * *